J. F. LE BARON.
COUNTERBORE.
APPLICATION FILED NOV. 6, 1909.
967,789.
Patented Aug. 16, 1910.
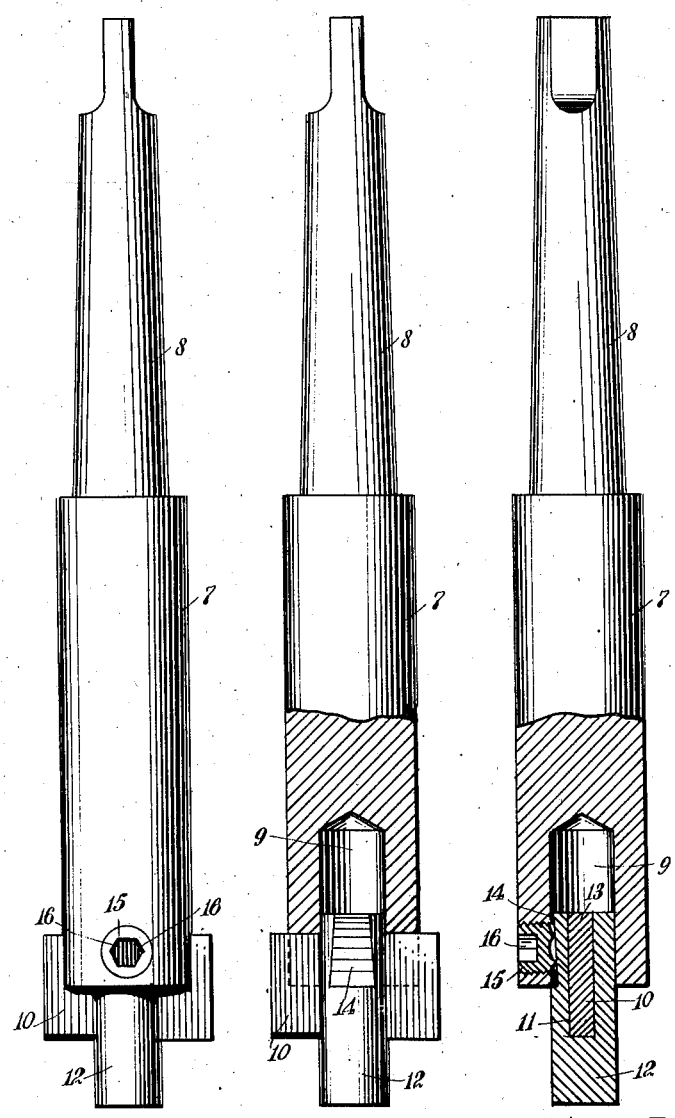
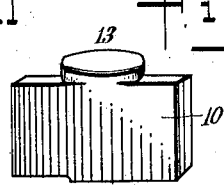
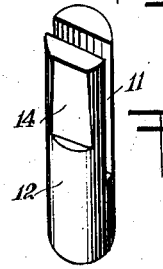
WITNESSES
INVENTOR
John F. Le Baron
BY
ATTORNEYS

UNITED STATES PATENT OFFICE.

JOHN F. LE BARON, OF RIDGWAY, PENNSYLVANIA, ASSIGNOR OF ONE-HALF TO CLIFFORD S. ESTES, OF RIDGWAY, PENNSYLVANIA.

COUNTERBORE.

967,789.  Specification of Letters Patent.  Patented Aug. 16, 1910.

Application filed November 6, 1909. Serial No. 526,545.

*To all whom it may concern:*

Be it known that I, JOHN F. LE BARON, a citizen of the United States, and a resident of Ridgway, in the county of Elk and State of Pennsylvania, have invented a new and Improved Counterbore, of which the following is a full, clear, and exact description.

Among the principal objects which the present invention has in view are: to provide a pilot to hold the cutting tool by being clamped thereon; to provide means for retaining the pilot and cutting tool in the tool holder, said means being removed from contact with the wall of the hole being bored; and to provide a counter-bore and tool holder therefor simple, economical and durable in construction.

One embodiment of the present invention is disclosed in the structure illustrated in the accompanying drawings, in which like characters of reference denote corresponding parts in all the views, and in which—

Figure 1 is a side view of a tool holder with a pilot and cutter constructed and equipped in accordance with the present invention; Fig. 2 is a partial longitudinal section thereof, showing the pilot and cutter in side elevation; Fig. 3 is a partial longitudinal section of the tool, holder, pilot and cutter, and means for holding the same; Fig. 4 is a perspective view of a counter-bore cutting tool constructed in accordance with the present invention; and Fig. 5 is a perspective view of a pilot constructed in accordance with the present invention.

A tool holder 7 is provided with a tapered shank 8 of usual construction, and a centrally bored hole 9 opening into the tool holder 7 from the forward end thereof. A transverse slot is milled across the end of the tool holder 7 concentrically with the hole 9, and of a width adapted to receive a cutter 10.

In operation, the pressure is introduced upon the cutter in a constant rotary direction, the effect of which is to rotate the cutter within the said slot until the sides of the cutter rest upon the opposite edges of the said slot. The cutters are placed in a slot 11 provided in a pilot 12. The pilot 12 is cylindrical, and at the forward end is formed solidly, as illustrated in Fig. 5 of the drawings. The slot 11 is formed to hold cutters of a given thickness, which will snugly fit the said slot and prevent the contraction of the sides of the pilot at that point. All pilots used in the holders 7 are fitted neatly to the hole 9, therefore, when a cutter is placed in the slot 11 and the slotted end of the pilot forced into the said hole, the barrel of the said pilot is firmly held, and is thereby held in the center with the tool 7. The cutters 10 are provided with an extension 13, adapted to extend within the continuous cylindrical portion of the hole 9 above the transverse slot formed in the holder. The extension 13 is preferably formed to neatly fit the hole 9, thereby centering the lateral extensions of the cutter when placed in operative position. The side of the pilot 12 is cut away to form a flat rest 14 for a set screw 15, whereby the pilot 12 is held in the hole 9. The set screw 15 is suitably threaded, and is mounted in a tapped perforation formed in the side of the holder 7. The set screw 15 is provided, in the present instance, with a hexagonal recess 16 to receive a solid hexagonal headed wrench. When the screw 15 is driven home, the upper edge thereof is not extended beyond the surface of the holder 7.

The operation of the device is obvious. The advantages in its use are equally obvious, numbering among which may be mentioned the rapidity and ease with which the cutters may be removed from and inserted in the tool holder 7; the avoidance of chatter in the tool; and the ease and economy involved in replacing a worn out or damaged pilot.

Having thus described my invention, what I claim as new and desire to secure by Letters Patent is:—

1. A counter-bore comprising a cylindrical pilot having a transverse slot formed therein; a cutting tool adapted to fit within said slot in said pilot; a holder having a round hole in the forward end thereof; and a device carried by said holder for holding said pilot in said hole by frictional engagement with the said pilot.

2. A counter-bore comprising a cylindrical pilot having a transverse slot formed therein; a holder having a hole formed in the forward end thereof adapted to receive the slotted end of said pilot; a cutting tool adapted to fit within said slot in said pilot; and a device carried by said holder for holding said pilot in said hole by frictional engagement with the said pilot.

3. A counter-bore comprising a cylindrical pilot having a transverse slot formed therein; a holder for said pilot; a cutting tool adapted to rest within the slot formed in said pilot and having an extension centrally located and adapted to fit within the said holder; and a device carried by said holder for holding said pilot therein by frictional engagement with the said pilot.

4. A counter-bore comprising a cylindrical pilot having a transverse slot formed therein, and a flattened surface formed on one of the portions of said pilot separated by said slot; a cutting tool adapted to rest within the slot formed in said pilot and having an extension centrally located and adapted to fit within the said hole in said holder; and a set screw held in threaded engagement with a perforation formed in said holder, entering the said hole therein and adapted to bear upon the flattened surface of said pilot.

In testimony whereof I have signed my name to this specification in the presence of two subscribing witnesses.

JOHN F. LE BARON.

Witnesses:
G. T. GREINER,
EMMA LUCHS.